United States Patent
Greb et al.

(10) Patent No.: US 6,482,339 B1
(45) Date of Patent: Nov. 19, 2002

(54) PROCESS FOR STABLE WIDTHWISE REGULATION OF BULB ANGLE IN EXTRUSION OF SHEETS OF HEAT-SENSITIVE PLASTICS THROUGH A CALENDER OPENING FORMED BY INTAKE ROLLERS

(75) Inventors: Horst Greb, Darmstadt; Erhard Haun; Karl Funk, both of Griesheim, all of (DE)

(73) Assignee: Roehm GmbH & Co. KG, Darmstadt (DE)

( * ) Notice: Subject to any disclaimer, the term of this patent is extended or adjusted under 35 U.S.C. 154(b) by 183 days.

(21) Appl. No.: 09/634,462

(22) Filed: Aug. 7, 2000

Related U.S. Application Data

(62) Division of application No. 09/161,613, filed on Sep. 28, 1998, now Pat. No. 6,152,720.

(30) Foreign Application Priority Data

Sep. 27, 1997 (DE) .......................................... 197 42 755

(51) Int. Cl.[7] .............................................. B29C 47/72
(52) U.S. Cl. ...................................................... 264/40.7
(58) Field of Search ............................... 264/40.5, 40.7; 425/147, 159, 145, 224

(56) References Cited

U.S. PATENT DOCUMENTS

| | | |
|---|---|---|
| 3,843,434 A | 10/1974 | Heiks et al. |
| 5,639,404 A | 6/1997 | Meier-Kaiser et al. |
| 5,960,374 A | 9/1999 | Lausier |

FOREIGN PATENT DOCUMENTS

| | | |
|---|---|---|
| DE | 2 329 758 | 1/1974 |
| DE | 92 08 837.6 | 12/1992 |
| DE | 92 12 406.2 | 12/1992 |
| EP | 0 429 161 A1 | 5/1991 |

OTHER PUBLICATIONS

Plast Europe, No. 3/4, p. 221, "Twin Scanner Controls Cast Film Thickness", Oct., 1993.
Patent Abstracts of Japan, vol. 014, No. 563 (M–1058), Dec. 14, 1990, JP 02 238922, Sep. 21, 1990.
Peter Mapleston, Modern Plastics International, vol. 26, No. 12, p. 119, "Temperature Measurement System Shortens Sheet Line Adjustment Time", Dec. 1996.

*Primary Examiner*—Mark Eashoo
(74) *Attorney, Agent, or Firm*—Oblon, Spivak, McClelland, Maier & Neustadt, P.C

(57) ABSTRACT

A process and device for the stable width wise regulation of the bulb angle in connection with the extrusion of sheets of heat-sensitive plastic (2) in an extrusion device with a calendar opening formed by two intake rollers (3,2) and a traversing measuring device (7) provided according to the calendar slot by altering positioning elements on the extrusion device. At least two traversing measurements of a parameter correlating with the bulb angle are started consecutively on the heat-sensitive plastic sheet synchronously with the positioning of one of the two calendar rollers. Like measurement conditions therefore exist and the deviation of the measured values obtained on the basis of the measurements in relation to specified expected values is used to regulate the bulb angle over its width by altering a setting element on the extrusion device.

6 Claims, 1 Drawing Sheet

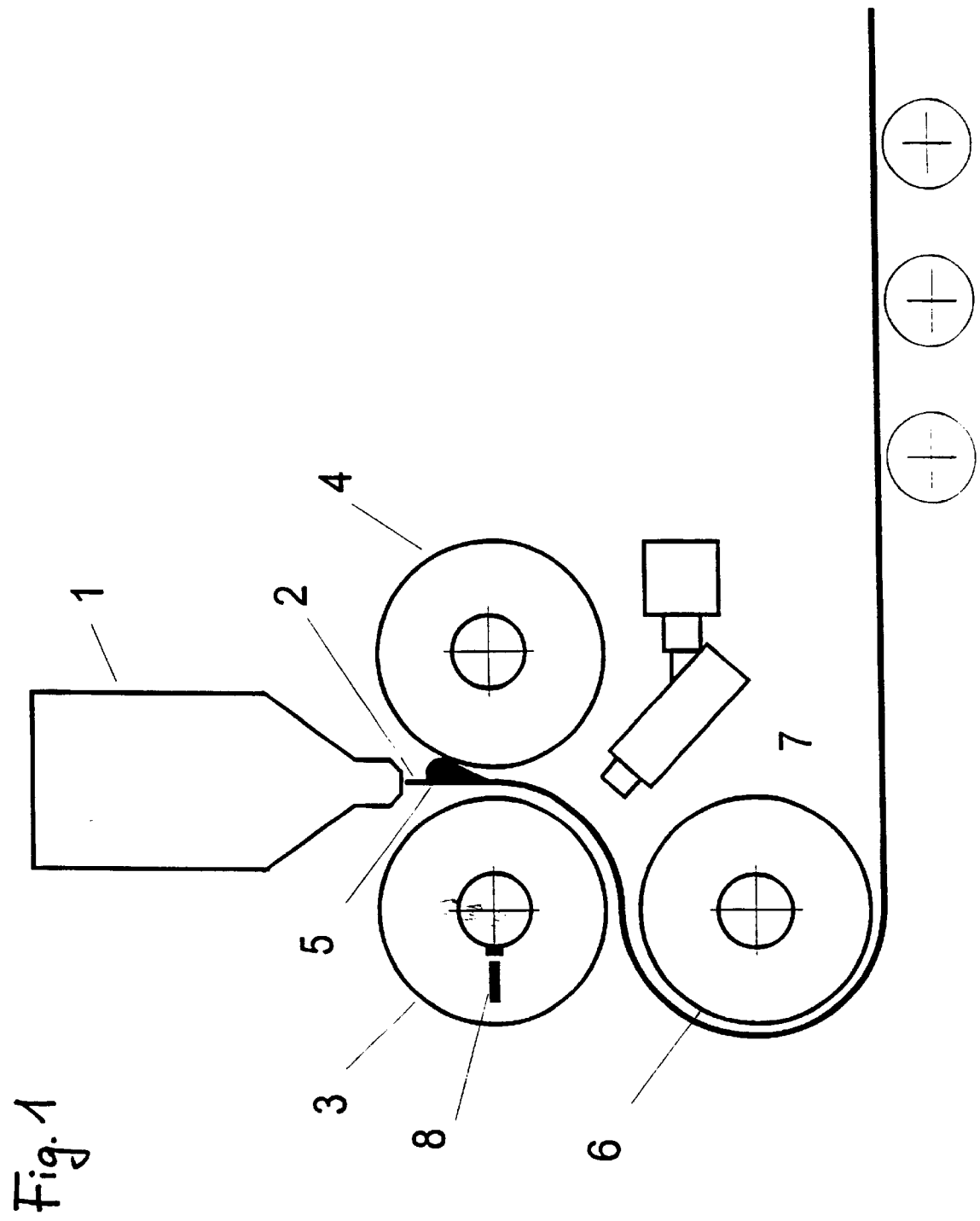

PROCESS FOR STABLE WIDTHWISE REGULATION OF BULB ANGLE IN EXTRUSION OF SHEETS OF HEAT-SENSITIVE PLASTICS THROUGH A CALENDER OPENING FORMED BY INTAKE ROLLERS

This application is a divisional application of Ser. No. 09/161,613 filed Sep. 28, 1998, now U.S. Pat. No. 6,152,720.

BACKGROUND OF THE INVENTION

1. Field of the Invention

The invention relates to extrusion technology for thermnoplastically deformable plastics, especially a process and a device for stable regulation of the bulb angle of plastic sheets for foils or plates.

2. Description of the Related Art

Extrusion facilities for heat-sensitive plastics are sufficiently known. Generally, roller calendars are used for bilateral smoothing of the surfaces of plastic sheets for plates or foils. The rollers are intended to cool and shape the melted plastic. The rollers take up the plastic vertically emerging in a molten state from a fishtail die into the calendar slit between two driven intake rollers. Generally, the plastic sheet is taken off by one of the intake rollers and diverted horizontally with the aid of another roller which presses upon the intake roller. The plastic sheet acquires a defined thickness and a smooth surface by being pressed through the calenders opening.

Factors which influence the surface characteristics of plastic sheets for bilaterally smoothed plates and foils are the composition of the polymer, the temperature and viscosity of the polymer melt stream, the temperature and surface characteristics of the rollers, the size of the calender slit and the speed of the rollers.

A homogeneous passage of the plastic through the calender opening is extremely important for flawless surface properties of the extruded material. Great significance attaches to the height of so-called "bulb" which forms in the calender slit between the intake rollers due to the back pressure of the polymer melt. Fluctuations due to local mass flow differences in the polymer melt leaving the extrusion nozzle lead to different melt accelerations on the surfaces of the intake rollers, owing to which the height of the bulb also changes.

The height of the bulb should only fluctuate within the smallest tolerances possible. If it is too low, contact of the extrudate on one of the intake rollers can be lost. This leads to a poor extrudate surface as a consequence and can also lead to sticking on the other intake roller due to the sharply altered cooling conditions. This so-called winding then leads to the breakdown of the process and generally to a standstill for several hours.

An excessively high bulb leads to disturbances of the extrudate surface owing to so-called bulb rolling. In this connection, the bulb is drawn in loop-like and, in a certain way, rolled up from above by contact with the entering extrudate stream. This leads to the formation of streaks running crosswise to the extrudate surface. In an extreme case, the stagnation bulb also reaches the nozzle lip and contaminates it, which again leads to disturbance of the extrudate surface. Cleaning the nozzle can only take place in connection with a facility shutdown.

Several procedures for controlling the bulb height are known. It is usual in practice for a manual readjustment of the bulb height to take place by altering the roller speed in conjunction with measuring the thickness of the cooled plastic sheet. This process has the disadvantage that since the intervention is undertaken manually, it is consequently open to subjective influences. Due to the relatively late measurement of thickness, a relatively high amount of wastage occurs until the adjustments lie within the tolerance sought. Furthermore, direct measurements of the height to the bulb through mechanical sensors or according to the laser triangulation method are known. The mechanical method is rather inexact, while the optical method has the disadvantage that it is prone to error owing to the high temperatures in the region of the stagnation bulb and the density fluctuation of the air caused thereby.

An automatic control operating with the aid of an adjusting wheel is known from DE 40 33 661 C2. The bearing pressure is determined on one of the intake rollers as a measure for the thickness of the sheet of material and is regulated by roller speed. Since the bearing pressure, however, is not only dependent upon the thickness of the sheet of material, but also upon the viscosity and temperature of the plastic stream, this control is also unsatisfactory.

Width wise control of the bulb angle for the extrusion of transparent foils with a thickness under 5 mm is known from G 92 12 406.2. Here, measurement of the orientation double refraction angle of the extruded foil is adduced as a measure for the bulb height and regulated by changing the adjustment of the mass flow of the extrusion nozzle.

GR patent 85.1420 describes a device for the width wise control of the bulb angle in the production of a bilaterally smoothed plastic sheet. The bulb angle is held constant since the surface temperature of the sheet after leaving the roller gap is used as an input. The molding mass discharge is increased or diminished upon any deviation from the expected temperature at a the constant operating state in continuous operation. The procedure has the disadvantage that it is too imprecise. In EP-A 0 429 161, a largely identical device is described as in GR patent 85.1420.

G 92 08 837.6 describes a device for eliminating the influence of roller impact on thickness distribution in an extruded, surface-smoothed foil. There, an even bulb angle is created on the calendar roller by means of a traversing bulb measurement and/or through a traversing foil thickness measurement. Production-related non-circularity is cited as a disturbing factor which causes sinusoidal fluctuations in thickness in the extruded and smoothed foil sheet. If measured thickness values which reproduce these sinusoidal fluctuations in thickness are used for an automatic control of the extrusion nozzle, this can bring about permanent fluctuations in bulb height which for their part produce turbulences in the bulb. As a result, the bulb rollers can lead to optical irregularities in the foil. The sinusoidal foil thickness fluctuations are eliminated through a traversing thickness measurement on the foil sheet with a sensing element, for example, a capacitive position pick-up or an interferometer which conducts measurements while being displaced along the direction of delivery of the foil sheet around half the circumference of the calender roller, and by an averaging of recorded thickness values in the same position in the delivery direction. The second measurement in any given case is started by a digit emitter displaced half a roller rotation in relation to the first measurement. Fluctuations in thickness of the extruded foil can thus be kept within a maximum deviation of 5% on the average.

In Spang, A. and Wüsternberg (1993).— "On-line Thickness Measurement: Non-Contact Process for Foil-Like Materials," in: *Plastics* 83, 11, p. 894–897, various thickness measuring procedures on calendered foils are described. Clearly recognizable thickness fluctuations with a sinusoidal course are described as disturbances. The time of oscillation corresponds to the circumference of the calender roller in this connection.

SUMMARY OF THE INVENTION

An object of the present invention is to improve known procedures so that a more stable regulation of the extrusion process results in comparison with the state of the art.

According to a feature of the invention, this and other objects are accomplished by a process for stable width wise regulation of a bulb angle in extrusion of sheets of heat-sensitive plastic using an extrusion device having a calender opening formed by intake rollers, and a traversing measuring device, comprising the steps of extruding a sheet of the heat-sensitive plastic using the extrusion device while rotating at least one of the intake rollers; performing, at least two times, a step of measuring a parameter of the thermoplastic sheet correlating with the bulb angle while moving the measuring device in the width wise direction of the sheet; determining the rotational angular position of one of the rotating intake rollers; synchronizing the measuring steps with the angular position of the one of the rotating intake rollers such that identical measurement conditions exist in the measuring steps; and regulating the bulb profile responsive to results of the measuring steps.

According to another feature of the invention, the above and other objects are accomplished by a device for stable width wise regulation of a bulb angle in extrusion of sheets of heat-sensitive plastic using an extrusion device having a calender opening formed by rotatable intake rollers, comprising a sensor positioned to sense the angular position of one of the intake rollers; a measuring device constructed and positioned for measuring a parameter of the thermoplastic sheet correlating with the bulb angle, and triggered for movement in the width wise direction of the extruded sheet in response to a sensed angular position of the one of the intake rollers; and means for altering positioning elements of the extrusion device in accordance with the parameter measured by the measuring device.

Underlying the invention is the knowledge that practically each of the traversing measurements undertaken on the extruded plastic sheet is subject to periodically occurring sinusoidal disturbing influences of the roller impact. Although the effect of the roller impact is usually rather small, and as a rule leads to tolerable width wise fluctuations in the bulb angle with an otherwise stable extrusion process, it represents a problem in combination with sensitive measurement and control facilities.

If the intake roller positioning and the respective positioning of a traversing measuring device are not synchronized with each other, then continuous non-comparable measurements of parameters correlating with the bulb angle are received, since the disturbing influences change with the position of the rollers. Therefore, apparent changes in measured values can be recorded which trigger corresponding control processes, even though the extrusion process is inherently stable. The consequence is a "nervous" adjustment which can lead to a drifting of the mean sheet thickness in an undesirable manner.

In accordance with the invention, these roller-specific and/or roller-individual influences can be equalized if the positions through which the traversing measuring device runs and the intake roller angular position can be synchronized. The disturbing influences occurring at certain intake roller angular positions owing to the impact of the roller are then approximately constant, so that one can proceed from stable measurement profiles in connection with a stable extrusion process despite the impact of the roller. Further disturbing influences, for example, unwanted changes in the position of the positioning elements or pulsating melt flows, can then be better recognized as a change in the measurement profile and can be better controlled.

BRIEF DESCRIPTION OF THE DRAWINGS

The invention is explained by the attached figure, but is not restricted to the embodiment represented. FIG. 1 schematically depicts a possible arrangement for a device of the invention from the side.

DETAILED DESCRIPTION OF THE PREFERRED EMBODIMENT

The invention proceeds from the known devices for extruding flat sheets for foils or plates of heat-sensitive plastic which have a calender and a traversing measuring device (7) behind the calender slit.

Practically all traversing measuring devices are suited for the process of the invention, in which measured parameters correlate with the bulb angle and in which the traversing measuring devices are located behind the calender slit, consequently, the traversing measuring details can be used for regulating the bulb angle over its width by changing the positioning elements of the extrusion device in a known manner.

Parameters correlating with the bulb angle are, for example, the temperature of the plastic sheet, the thickness of the plastic sheet or the orientation double refraction of the plastic sheet. The traversing measuring device (7) can therefore, for example, be a pyrometric measuring device which records the thermal profile of the extruded sheet, through which indirect inferences can be made about the bulb angle (see for example, EP-A 0 429 161). Likewise, the traversing measuring system may be designed for measuring the orientation double refraction (see for example DE-U 92 12 406.2). The latter is especially suited for extrusion of foils from plastics with a high intrinsic birefringence, such as, for example, polystyrene or polycarbonate. So, for example, is a measurement device for eliminating the roller impact corresponding to DE-U 92 08 837.6 (G 92 08 837.6). Several measuring devices can also be present at the same time.

The calender gap is formed by two intake rollers (3, 4), through the opening of which the plastic melt (2) is conducted from a wide opening extrusion nozzle (1), while forming a bulb (5). Usually, the plastic sheet is additionally passed over one or several guide rollers (6). (A summary of roller arrangements typical for the industry can be found in Groβ, H. (1997) in Plastics 87, 5, p. 564–568, "How the most favorable roller arrangement looks," for example.)

Behind the calendar opening, a traversing measurement device (7) is installed in a known manner. This consists of a sensor device, for example, a pyrometer or an infrared probe, and a precision linear unit which is mounted on the sensing element. The sensor can consequently traverse the width of the plastic sheet, preferably at right angles to the direction of extrusion, at a slight distance to the extruded plastic sheet.

Below, we are proceeding from the assumption that the extrusion process, for example, in connection with a foil extrusion, has already started, and that the device is discharging a foil the mean thickness of which lies within the requisite range.

Now at least two measurements take place under the same conditions, that is, at preferably constant roller speed and identical traversing speed of the traversing measuring device. At the same time, a great number of individual values, for example, 10–300 measurement values at defined positions over the width of the plastic sheet, are gathered. An actual measurement value curve is plotted on the basis of the individual measurement values (observed values) over width. This observed measurement curve can be compared with a specified expected curve.

A triggering sensor (8) positioned on the intake roller (4) (for example, an inductive or capacitive proximity sensor or a light barrier) triggers a first traversing measurement at a defined roller position, for example 12 o'clock. The roller speed is preferably constant during measurement. On the basis of the measurement data, the first width wise measured profile emerges, which can be a temperature profile in the case of a pyrometric measurement.

When the traversing measuring device or the measuring element has passed over the width of the plastic sheet, the measurement is terminated and the sensor head returns, for example, at a high rate of speed, to the initial position. Subsequently, a second measurement is performed, which is once again triggered by the triggering sensor (8) at the same roller angular setting of the roller (4) under the same conditions as with the first measurement. Preferably, further measurements take place at regular intervals, again at the same roller setting and under like conditions.

The observed value measurement profiles are represented in the form of printouts or optical representations on a computer monitor, for example, and compared with specified expected value curves. The expected value curves can, for example, be derived from empirical values in connection with manually conducted regulation. An expected value curve or an expected value line can result from the mean values of individual measurements, for example. As a rule, the respective expected value curve is specifically selected for the respective extrusion process.

The evaluation of the observed measured value curves in comparison with the expected value curves and, if need be, the control process resulting from these, can take place manually or, for example, with the aid of a computer program in a computer. If the actual measurement value curve and the expected value curve manifest no deviations or only slight deviations from each other within a specified range, then no adjustment process takes place since the extrusion process is stable as a whole.

If the deviation of the actual measured value curve from the specified expected value curve is, for example, too high at a specified width wise position, a correspondingly local intervention by the adjusting elements of the extrusion device, for example the extension bolts or piezo translators, can take place on the extrusion nozzle in a known manner (on this, see for example EP-A 367-022, EP-AS 43 5 078, EP-A 418 681 and EP-A 484 841). Likewise, the rate of the extruder snail or geared melt pump of the extruder can be changed through a control circuit, for example, as a result of which the bulb angle is influenced as a whole. Preferably, the regulation takes place by changing the adjusting elements on the extrusion nozzle. By changing the positioning elements, the bulb angle in the calender opening is altered such that approximately constant conditions occur again. If the speed of the intake rollers is altered, then at least two new measurements must subsequently take place once more under like conditions in order to proceed from comparable measurement conditions again.

A device of the process of the invention includes the two intake rollers (3,4) and a traversing measurement device (7) located behind the calender slit. One of the two intake rollers (3, 4) of the calender slit is outfitted with a trigger sensor (8) which always starts the traversing measuring device (7) at the same angular position of the intake roller. An inductive or capacitive approximation sensor or a light barrier, for example, can be used as the trigger sensor (8).

When using the process of the invention or the device of the invention, foils or plates of heat sensitive plastics of all types, preferably with a thickness up to 5 mm, can be produced with a high uniformity. The process of the invention or the device of the invention is thereby suited for practically all thermnoplastically processable plastics, especially for polystyrene, polyethylene terephthalate, polybutylene terephthalate, especially preferably for polycarbonate and for polymethyl methacrylate.

What is claimed is:

1. A process for stable width wise regulation of a bulb angle in extrusion of sheets of heat-sensitive plastic using an extrusion device having a calender opening formed by intake rollers, and a traversing measuring device, comprising the steps of:

extruding a sheet of the sheets of heat-sensitive plastic using the extrusion devices while rotating at least one of the intake rollers;

performing, at least two times, a step of measuring a parameter of the sheet of the sheets of heat-sensitive plastic correlating with the bulb angle. while moving the traversing measuring device in a width wise direction of the sheet of the sheets of heat-sensitive plastic;

determining a rotational angular position of one of the intake rollers which is rotating;

synchronizing said steps of measuring the parameter of the sheet of the sheets of heat-sensitive plastic with said step of determining the rotational angular position of the one of the intake rollers which is rotating such that identical measurement conditions exist in each of the steps of measuring the parameter of the sheet of the sheets of heat-sensitive plastic; and regulating a profile of the bulb angle responsive to results of each of said steps of measuring the parameter of the sheet of the sheets of heat-sensitive plastic.

2. The process according to claim 1, wherein the parameter correlating with the bulb angle is a temperature of the sheet of the sheets of heat-sensitive plastic.

3. The process according to claim 1, wherein the parameter correlating with the bulb angle is a thickness of the sheet of the sheets of heat-sensitive plastic.

4. The process according to claim 1, wherein the parameter correlating with the bulb angle is an orientation double refraction of the plastic sheet.

5. The process according to claim 1, wherein said step of regulating the profile of the bulb angle comprises regulating a rate of extrusion.

6. The process according to claim 1, wherein each of said steps of measuring the parameter of the sheet of the sheets of heat-sensitive plastic comprises performing a plurality of measurements along a width of the sheet of the sheets of heat-sensitive plastic, and wherein said step of regulating the profile of the bulb angle comprises locally regulating a widthwise parameter of the extrusion device based on said step of performing the plurality of measurements along the width of the sheet of the sheets of heat-sensitive plastic.

* * * * *